(12) United States Patent
Liao et al.

(10) Patent No.: US 9,400,574 B2
(45) Date of Patent: Jul. 26, 2016

(54) INTERACTIVE TOUCH SYSTEM AND LIGHT SOURCE DEVICE

(71) Applicants: Chien-Chung Liao, Hsin-Chu (TW); Yao-Shun Lin, Hsin-Chu (TW)

(72) Inventors: Chien-Chung Liao, Hsin-Chu (TW); Yao-Shun Lin, Hsin-Chu (TW)

(73) Assignee: Coretronic Corporation, Hsin-Chu (TW)

( * ) Notice: Subject to any disclaimer, the term of this patent is extended or adjusted under 35 U.S.C. 154(b) by 78 days.

(21) Appl. No.: 14/602,287

(22) Filed: Jan. 22, 2015

(65) Prior Publication Data
US 2015/0309664 A1 Oct. 29, 2015

(30) Foreign Application Priority Data
Apr. 25, 2014 (TW) .............................. 103115025 A (51) Int. Cl.
*G06F 3/042* (2006.01)
*G02B 5/10* (2006.01)
*H04N 9/31* (2006.01)

(52) U.S. Cl.
CPC ............... *G06F 3/0421* (2013.01); *G02B 5/10* (2013.01); *G06F 3/0425* (2013.01); *H04N 9/3194* (2013.01); *G06F 2203/04109* (2013.01)

(58) Field of Classification Search
CPC ....... G06F 3/041; G06F 3/0412; G06F 3/042; G06F 3/0421; G06F 2203/04109; G06F 1/16
See application file for complete search history.

(56) References Cited

U.S. PATENT DOCUMENTS

| | | | | |
|---|---|---|---|---|
| 6,147,720 A | * | 11/2000 | Guerinot | H04N 9/3164 348/743 |
| 6,758,579 B2 | * | 7/2004 | Ishikawa | G02B 26/0841 348/742 |
| 9,317,137 B2 | * | 4/2016 | Liao | G06F 3/0325 |
| 2004/0208348 A1 | * | 10/2004 | Baharav | G06F 3/0421 382/124 |
| 2008/0106628 A1 | * | 5/2008 | Cok | H04N 7/144 348/333.01 |
| 2009/0027631 A1 | * | 1/2009 | Liu | G03B 33/08 353/84 |
| 2009/0109178 A1 | * | 4/2009 | Kim | H04N 5/23203 345/166 |
| 2012/0001871 A1 | * | 1/2012 | Chang | G06F 3/0421 345/175 |
| 2012/0127128 A1 | * | 5/2012 | Large | G06F 3/0425 345/175 |
| 2012/0169669 A1 | * | 7/2012 | Lee | G06F 3/042 345/175 |
| 2013/0135260 A1 | | 5/2013 | Damhaug et al. | |
| 2013/0278612 A1 | * | 10/2013 | Holman | G02B 6/0031 345/501 |

FOREIGN PATENT DOCUMENTS

| | | | |
|---|---|---|---|
| CN | 1479079 | | 3/2004 |
| CN | 1479079 A | * | 3/2004 |
| CN | 2791601 | | 6/2006 |
| CN | 202929344 | | 5/2013 |

\* cited by examiner

*Primary Examiner* — Joe H Cheng
(74) *Attorney, Agent, or Firm* — Jianq Chyun IP Office (57) ABSTRACT

An interactive touch system includes a display device, a light source device and an invisible light detecting device. The display device is adapted to provide an image beam to a display surface. The light source device includes a light-emitting element and a light-guide element. The light-guide element has a conical surface and a cylindrical curved surface facing the conical surface. The curvature center of at least partial section of the cylindrical curved surface is not located on the central axis of the conical surface. The light-emitting element is adapted to emit an invisible light beam toward the conical surface, and the invisible light beam is reflected by the conical surface and the cylindrical curved surface to be diverged and range over the display surface. When an object moves to the display surface, the invisible light beam is reflected by the object to be detected by the invisible light detecting device.

20 Claims, 5 Drawing Sheets

INTERACTIVE TOUCH SYSTEM AND LIGHT SOURCE DEVICE

CROSS-REFERENCE TO RELATED APPLICATION

This application claims the priority benefit of Taiwan application serial no. 103115025, filed on Apr. 25, 2014. The entirety of the above-mentioned patent application is hereby incorporated by reference herein and made a part of this specification.

BACKGROUND OF THE INVENTION

1. Field of the Invention

The invention is related to an interactive touch system and a light source device thereof, and more particularly to an interactive touch display system and a light source device thereof.

2. Description of Related Art

An interactive projection system is a projection system for a user to perform touch operation on a projected area. The interactive projection system uses an invisible light beam (such as infrared light beam) emitted by a light source device to range over the projected area, so that the invisible light beam is reflected by a touch object (such as a finger of the user or a touch pen) when the user performs touch control on the projected area, so as to detect a touch position via the invisible light detecting device. So that the invisible light beam emitted by the light source device arranged at an edge of the projected area can range over the whole projected area, two light source devices adapted to emit invisible light beams having divergence angles equal to or larger than 90 degrees are generally combined into a light source device capable of emitting an invisible light beam having a divergence angle of at least 180 degrees. However, combining two light source devices increases the volume and cost and multiplies difficulty in assembly and adjustment.

Another way is to arrange a single light source device adapted to emit an invisible light beam having a divergence angle of 360 degrees at a center of an edge of the projected area, wherein the light source device includes a light-emitting element and a light-guide element, and the light-guide element has a conical surface. An invisible light beam emitted by the light-emitting element is reflected by the conical surface and then is able to generate an invisible light beam having a divergence angle of 360 degrees to range over the projected area. However, in this invisible light beam having the divergence angle of 360 degrees, only half of the invisible light beam (i.e. an invisible light beam having a divergence angle within a range of 180 degrees) proceeds toward the projected area and is used, and the other half of the invisible light beam (i.e. an invisible light beam within a range of another 180 degrees) does not proceed toward the projected area and thus becomes invalid light, resulting in low utilization efficiency of the invisible light beam emitted by the light source device.

U.S. patent number US20130135260 discloses an interactive device, wherein a lighting device thereof projects a light surface and forms an interactive surface, and a camera retrieves a picture frame that an object touches the interactive surface and thereby calculates a touched point position touched by the object on the interactive surface. Therein, the lighting device uses a conical reflective element to reflect light, so that the light diffuses in a circular fashion to form a fan-shaped light curtain. Chinese patent number CN202929344U discloses a laser light curtain system disposed at a central top position of a screen, emitting a laser light curtain that goes through a lens assembly and then is reflected by a conical mirror to generate a laser light curtain having a field angle larger than 180 degrees and parallel to the screen. Chinese patent number CN1479079A discloses a total reflection conical optical spreader within an optical lens, wherein a light beam emitted by a laser module has total reflection and becomes a light plane. Chinese patent number CN2791601Y discloses a conical reflex mirror, wherein a beam center of a laser beam overlaps an apex angle thereof, so that the laser beam becomes a horizontal laser light plane via reflection by the conical reflex mirror.

SUMMARY OF THE INVENTION

An interactive touch system is provided, wherein utilization efficiency of an invisible light emitted from a light source device is enhanced.

A light source device is provided, wherein utilization efficiency of an invisible light emitted therefrom is enhanced.

Other purposes and advantages of the invention can be further understood from the technical features broadly embodied and described as follows.

To achieve one or part or all of the above purposes or other purposes, an embodiment of the invention provides an interactive touch system, including a display device, a light source device and an invisible light detecting device. The display device is adapted to provide an image beam to a display surface. The light source device includes a light-emitting element and a light-guide element. The light-guide element has a conical surface and a cylindrical curved surface. The cylindrical curved surface faces the conical surface, and curvature centers of at least partial section of the cylindrical curved surface are not located on a central axis of the conical surface. The light-emitting element is adapted to emit an invisible light beam toward the conical surface, and the invisible light beam is reflected by the conical surface and the cylindrical curved surface to be diverged and range over the display surface. When an object moves to the display surface, the invisible light beam is reflected by the object and is detected by the invisible light detecting device.

In order to achieve one or part of or all of the above purposes or other purposes, an embodiment of the invention provides a light source device adapted for an interactive touch system. An interactive touch system includes a display device and an invisible light detecting device. The display device is adapted to provide an image beam to a display surface. The light source device includes a light-emitting element and a light-guide element. The light-guide element has a conical surface and a cylindrical curved surface. The cylindrical curved surface faces the conical surface, and curvature centers of at least partial section of the cylindrical curved surface are not located on a central axis of the conical surface. The light-emitting element is adapted to emit an invisible light beam toward the conical surface, and the invisible light beam is reflected by the conical surface and the cylindrical curved surface to be diverged and range over the display surface. When an object moves to the display surface, the invisible light beam is reflected by the object and is detected by the invisible light detecting device.

In an embodiment of the invention, the invisible light beam is reflected by the conical surface and the cylindrical curved surface sequentially and then transmitted along a direction parallel to the display surface.

In an embodiment of the invention, the central axis of the conical surface is perpendicular to the display surface, an apex angle of the conical surface is 90 degrees, and a light-emitting direction of the light-emitting element is parallel to the central axis of the conical surface.

In an embodiment of the invention, all curvature central axes of the cylindrical curved surface are parallel to the central axis of the conical surface.

In an embodiment of the invention, one part of the invisible light beam is reflected by the conical surface and then transmitted toward a region where the display surface is located, and another part of the invisible light beam is reflected by the conical surface and then transmitted toward to the cylindrical curved surface and is reflected by the cylindrical curved surface to be transmitted toward the region where the display surface is located.

In an embodiment of the invention, the region where the display surface is located and the cylindrical curved surface are located on two opposite sides of the conical surface respectively.

In an embodiment of the invention, the light source device is arranged at an edge of the display surface, and a divergence angle of the invisible light beam after being reflected by the conical surface and the cylindrical curved surface is larger than or equal to 180 degrees to range over the display surface.

In an embodiment of the invention, the cylindrical curved surface is a semi-cylindrical concave surface, and the semi-cylindrical concave surface faces the conical surface.

In an embodiment of the invention, at least part of the cylindrical curved surface has a reflective layer thereon, and the reflective layer corresponds to the partial section with the curvature centers not located on the central axis of the conical surface.

In an embodiment of the invention, the light-guide element is a cylindrical body, the cylindrical curved surface is located on a cylindrical surface of the cylindrical body, and the conical surface is located on a side surface of the cylindrical body.

Based on the above, the embodiment of the invention has at least one of the following advantages. In the above embodiment of the invention, the light-guide element has a cylindrical curved surface facing the conical surface, and curvature centers of at least partial section of the cylindrical curved surface are designed not to be located on a central axis of the conical surface. Thereby, when the invisible light beam is reflect to the cylindrical curved surface by the conical surface and further reflected by the cylindrical curved surface, at least part of the invisible light beam reflected by the cylindrical curved surface does not proceed toward the central axis of the conical surface and a position too close to this central axis, so that the invisible light beam is not reflected or refracted again by the conical surface. Accordingly, when the invisible light beam emitted by the light-emitting element is reflected by the conical surface and becomes an invisible light beam having a divergence angle of 360 degrees, in addition to one part of the invisible light beam transmitted toward the display surface (i.e. the invisible light beam having a divergence angle within 180 degrees) that can be utilized by the interactive touch system, the other part of the invisible light beam (i.e. the invisible light beam having a divergence angle within another 180 degrees) is at least partially reflected by the cylindrical curved surface without being reflected or refracted again by the conical surface and is transmitted toward the display surface, so as to be utilized by the interactive touch system, thereby enhancing utilization efficiency of the invisible light beam emitted by the light source device.

Other objectives, features and advantages of the present invention will be further understood from the further technological features disclosed by the embodiments of the present invention wherein there are shown and described preferred embodiments of this invention, simply by way of illustration of modes best suited to carry out the invention.

BRIEF DESCRIPTION OF THE DRAWINGS

The accompanying drawings are included to provide further understanding, and are incorporated in and constitute a part of this specification. The drawings illustrate exemplary embodiments and, together with the description, serve to explain the principles of the disclosure.

DESCRIPTION OF EMBODIMENTS

In the following detailed description of the preferred embodiments, reference is made to the accompanying drawings which form a part hereof, and in which are shown by way of illustration specific embodiments in which the invention may be practiced. In this regard, directional terminology, such as "top," "bottom," "front," "back," etc., is used with reference to the orientation of the Figure(s) being described. The components of the present invention can be positioned in a number of different orientations. As such, the directional terminology is used for purposes of illustration and is in no way limiting. On the other hand, the drawings are only schematic and the sizes of components may be exaggerated for clarity. It is to be understood that other embodiments may be utilized and structural changes may be made without departing from the scope of the present invention. Also, it is to be understood that the phraseology and terminology used herein are for the purpose of description and should not be regarded as limiting. The use of "including," "comprising," or "having" and variations thereof herein is meant to encompass the items listed thereafter and equivalents thereof as well as additional items. Unless limited otherwise, the terms "connected," "coupled," and "mounted" and variations thereof herein are used broadly and encompass direct and indirect connections, couplings, and mountings. Similarly, the terms "facing," "faces" and variations thereof herein are used broadly and encompass direct and indirect facing, and "adjacent to" and variations thereof herein are used broadly and encompass directly and indirectly "adjacent to". Therefore, the description of "A" component facing "B" component herein may contain the situations that "A" component directly faces "B" component or one or more additional components are between "A" component and "B" component. Also, the description of "A" component "adjacent to" "B" component herein may contain the situations that "A" component is directly "adjacent to" "B" component or one or more additional components are between "A" component and "B" component. Accordingly, the drawings and descriptions will be regarded as illustrative in nature and not as restrictive.

Figure 1:
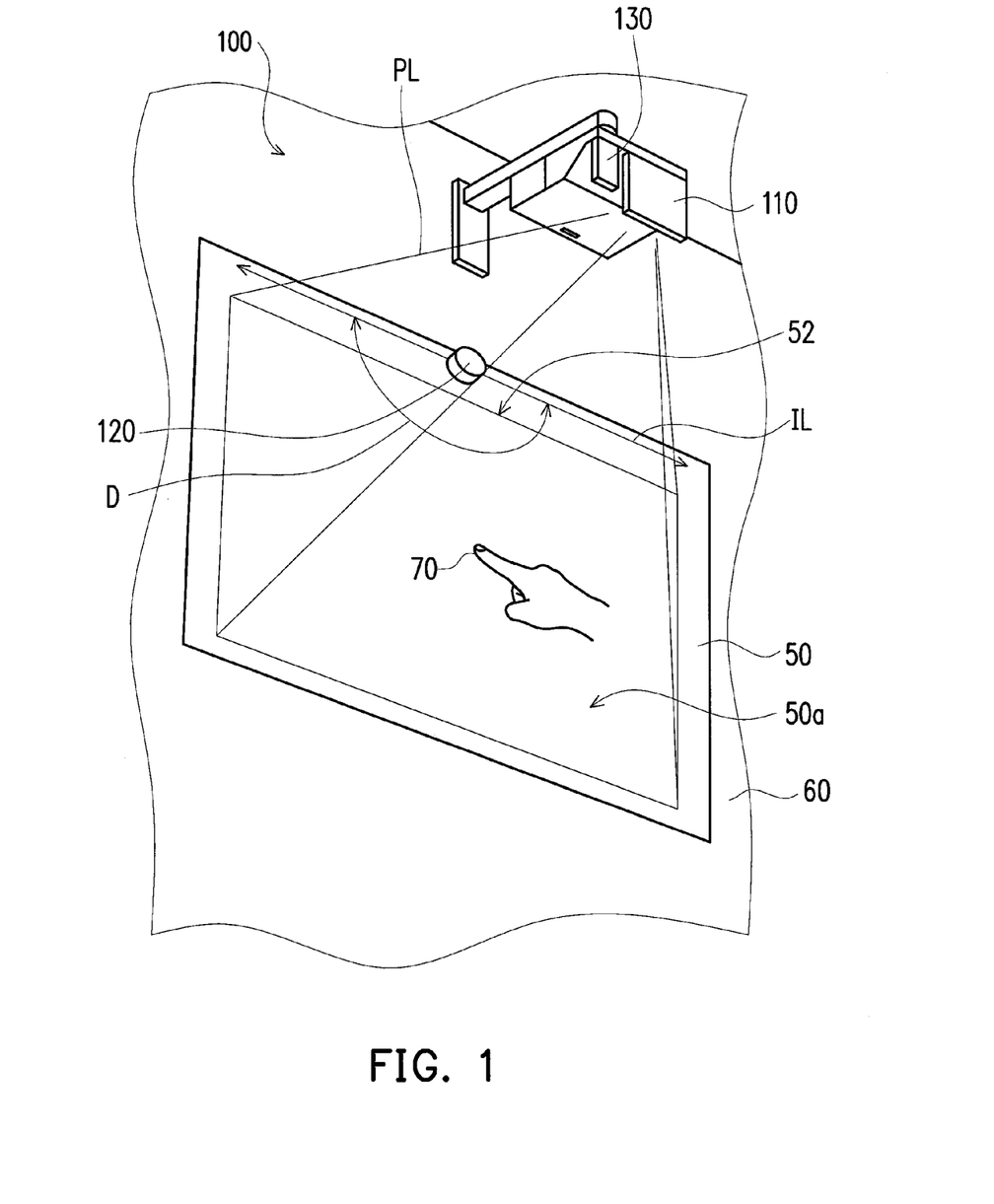
FIG. 1 is a schematic view of an interactive touch system according to an embodiment of the invention.

FIG. 1 is a schematic view of an interactive touch system according to an embodiment of the invention. Referring to FIG. 1, an interactive touch system 100 includes a display device 110, a light source device 120 and an invisible light detecting device 130, wherein the display device 110 is adapted to provide an image beam PL to a display surface 50*a*. In the embodiment as illustrated in FIG. 1, the interactive touch system 100 is an interactive touch system for projection, and the display device 110 is a projection device. In other embodiments, the display device may also be a liquid crystal display device, an organic light emitting diode (OLED) display device or a cathode ray tube (CRT) display device, etc., and the invention is not limited thereto. In this embodiment, the display surface 50*a* is a projection area such as a partial surface of a white board 50 fixed onto a wall 60 or a plane adapted for receiving the image beam PL.

The light source device 120 is arranged at a center position of an edge 52 of the display surface 50*a* and is used for emitting an invisible light beam IL (such as infrared light beam) which is parallel to the display surface 50*a*, so that a divergence angle D of the invisible light beam IL ranges over the whole display surface 50*a*. The divergence angle D of the invisible light beam IL of this embodiment is larger than or equal to 180 degrees, and in other embodiments, based on the distance between the light source device and the display surface, the divergence angle D of the invisible light beam IL may also be smaller than 180 degrees. The invention is not limited thereto. The invisible light detecting device 130 is, for example, a camera. When a user performs touch control to the display surface 50*a* so that an object 70 (such as a finger of the user or other objects) moves closer to the display surface 50*a*, the invisible light beam IL is reflected by the object and detected by the invisible light detecting device 130, so as to determine a touch position of the object 70 on the display surface 50*a*, thereby achieving the function that the displayed image interacts with the user. In addition, when the display device is a liquid crystal display, an OLED display or a CRT display, etc., the invisible light detecting device 130 may be arranged around the display surface 50*a*, but the invention is not limited thereto. The position of the invisible light detecting device should be disposed as long as the invisible light detecting device is able to detect the invisible light beam IL reflected by the object 70.

Figure 2:
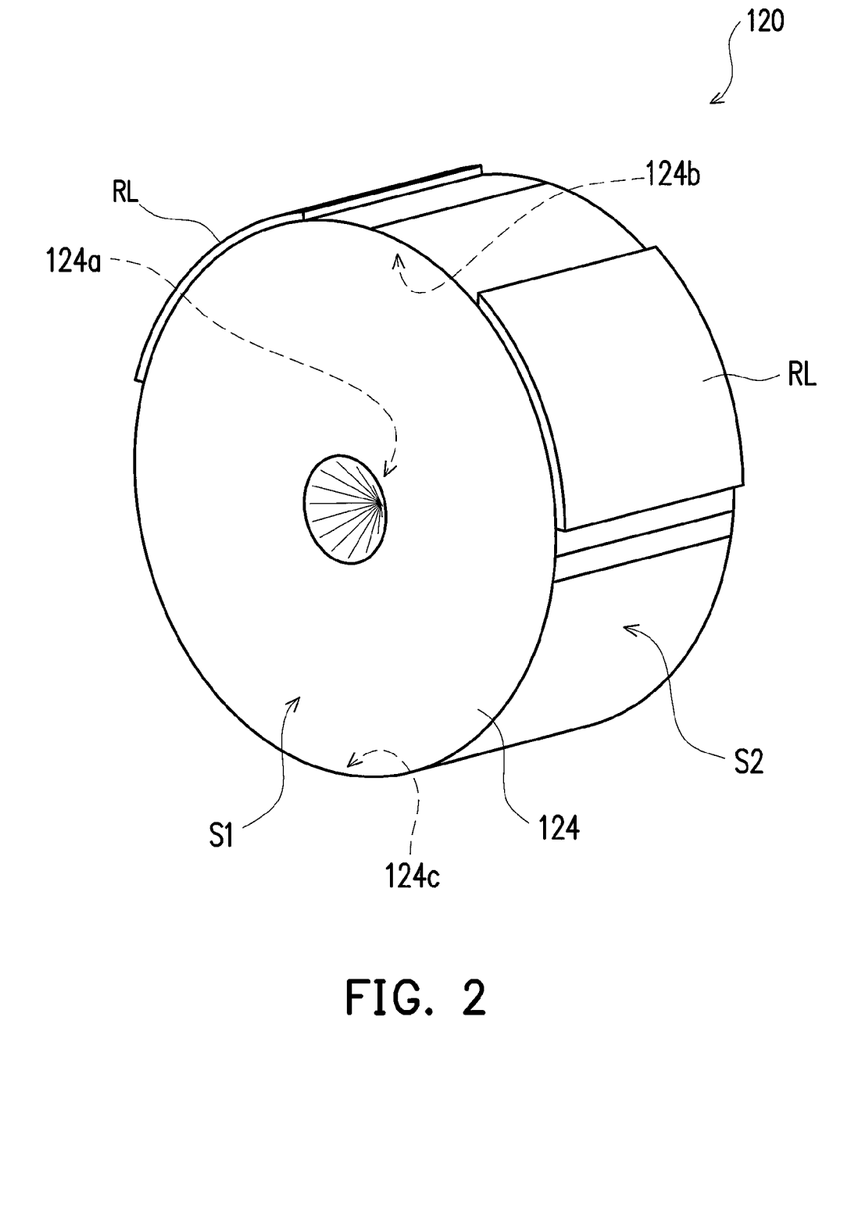
FIG. 2 is a perspective view of a light source device of FIG. 1.
Figure 3:
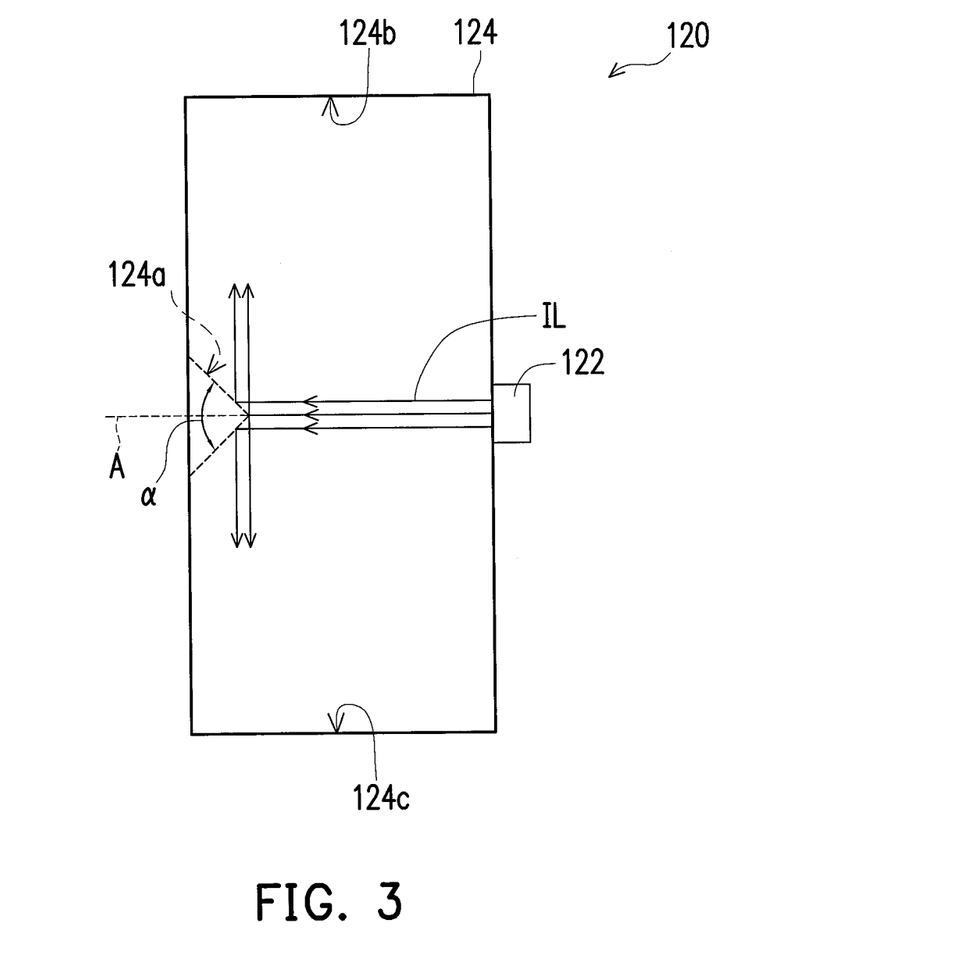
FIG. 3 is a side view of a partial structure of the light source device of FIG. 2.
Figure 4:
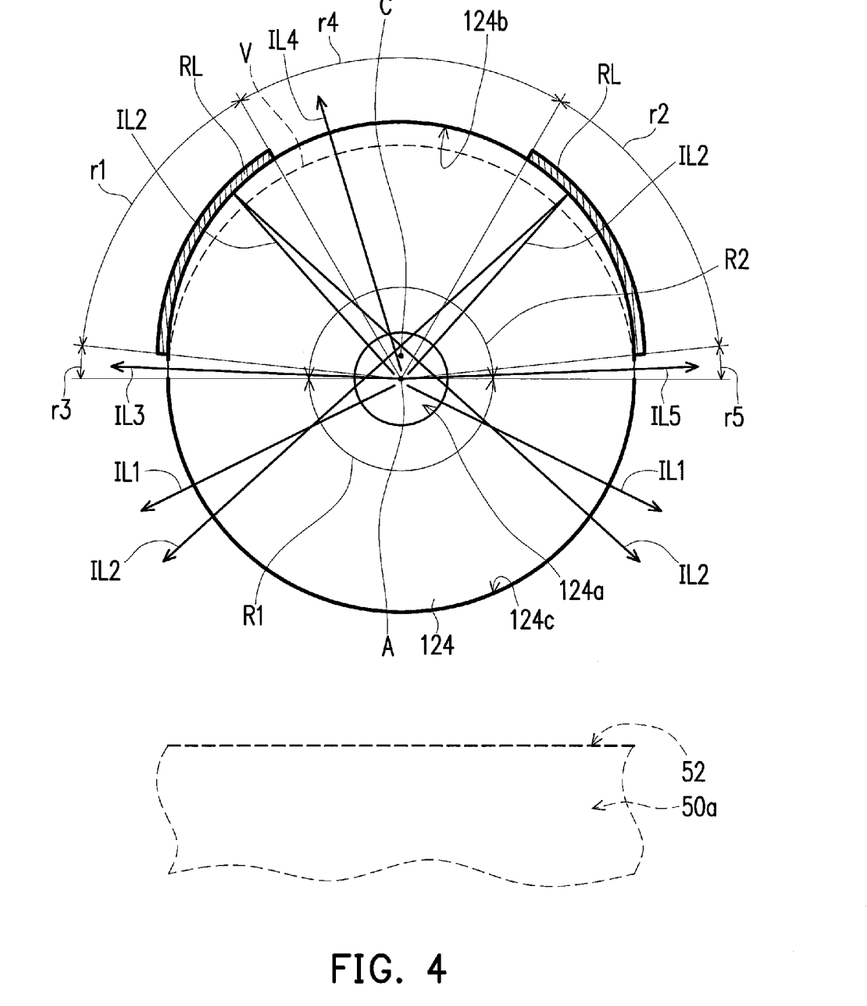
FIG. 4 is a top view of a partial structure of the light source device of FIG. 2.

Below is a specific description of the arrangement and functioning manner of the light source device 120. FIG. 2 is a perspective view of a light source device of FIG. 1. FIG. 3 is a side view of a partial structure of the light source device of FIG. 2. FIG. 4 is a top view of a partial structure of the light source device of FIG. 2. To make the figure clearer, a reflecting layer RL in FIG. 2 is not shown in FIG. 3. Referring to FIGS. 2 to 4, the light source device 120 includes a light-emitting element 122 and a light-guide element 124. The light-guide element 124 is, for example, a cylindrical body formed by an injection molding process and is a transparent plastic piece having a conical surface 124*a* and a cylindrical curved surface 124*b*. The conical surface 124*a* is located on a side surface S1 of the cylindrical body and is concaved within from an outer side of the side surface S1. The cylindrical curved surface 124*b* is located on a cylindrical surface S2 of the cylindrical body and faces the conical surface 124*a*. The region where the display surface 50*a* is located (i.e. a coverage of the image beam PL as shown in FIG. 1) and the cylindrical curved surface 124*b* are located respectively on two opposite sides of the conical surface 124*a*.

Figure 5:
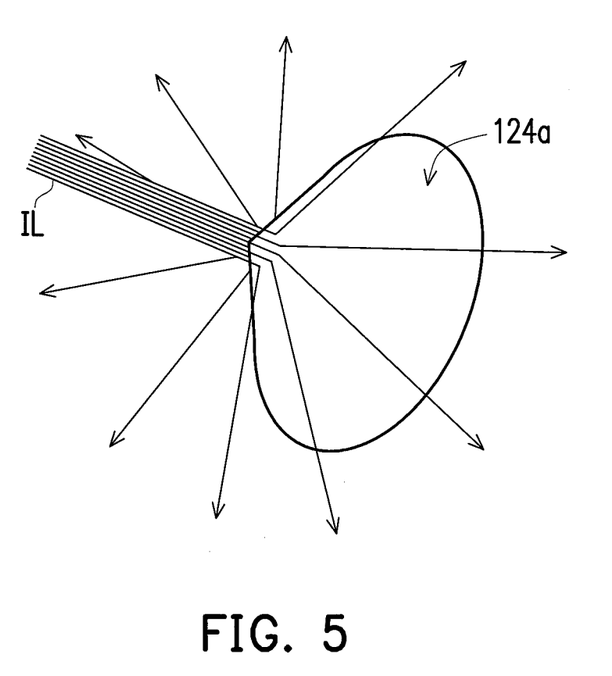
FIG. 5 is a schematic view of the invisible light beam reflected by the conical surface.

FIG. 5 is a schematic view of the invisible light beam reflected by the conical surface. The light-emitting element 122 as shown in FIG. 3 is arranged on another side surface opposite to the side surface S1 of the light-guide element 124 and located on a central axis A of the conical surface 124*a*, and the light-emitting element 122 is adapted to emit the invisible light beam IL toward the conical surface 124*a*, so that the invisible light beam IL has total reflection by the conical surface 124*a* and becomes an invisible light beam IL having a divergence angle of 360 degrees, as shown in FIG. 5. It should be noted that to make the drawings clearer, FIG. 4 merely illustrates partial light of the invisible light beam IL, and the divergence angel of the invisible light beam IL is 360 degrees which actually covers ranges R1 and R2.

More specifically, the light-guide element 124 of this embodiment has another curved surface 124*c*, and the curved surface 124*c* is, for example, a semi-cylindrical concave surface having a curvature center (not shown) on the central axis A of the conical surface 124*a*, so that the invisible light beam IL is reflected by the conical surface 124*a* and then passes through the curved surface 124*c* successfully to be transmitted toward the region where the display surface 50*a* is located. If the cylindrical curved surface 124*b* overlaps with a dashed line V as shown in FIG. 4 so that the cylindrical curved surface 124*b* and the curved surface 124*c* form a complete cylindrical concave surface, the curvature center of the cylindrical curved surface 124*b* is also located on the central axis A of the conical surface 124*a*. Thereby, when the invisible light beam IL is reflected to the cylindrical curved surface 124*b* by the conical surface 124*a* and further reflected by the cylindrical curved surface 124*b*, the invisible light beam IL proceeds toward the central axis A of the conical surface 124*a* and is reflected or refracted again by the conical surface 124*a*, thus forming a stray light beam. The stray light beam is not parallel to the display surface 50*a* so as to disturb touch accuracy. To avoid such a situation, the cylindrical curved surface 124*b* of this embodiment is designed to deviate from the dashed line V so that curvature centers of at least partial section of the cylindrical curved surface 124*b* (curvature centers C of the whole section of the cylindrical curved surface 124*b* as illustrated in FIG. 4) are not located on the central axis A of the conical surface 124*a*. Thus, when the invisible light beam IL is reflected to the cylindrical curved surface 124*b* by the conical surface 124*a* and further reflected by the cylindrical curved surface 124*b*, at least part of the invisible light beam IL reflected by the cylindrical curved surface 124*b* does not proceed toward the central axis A of the conical surface 124*a* and a position much closer to the central axis A so as not to be reflected or refracted again by the conical surface 124*a*.

Accordingly, when the invisible light beam IL emitted by the light-emitting element 122 is reflected by the conical surface 124*a* and becomes an invisible light beam having a divergence angle of 360 degrees as shown in FIG. 5, in addition to one part of the invisible light beam (i.e. the invisible light beam IL having the divergence angle within the range R1 of 180 degrees as shown in FIG. 4 and marked as IL1) transmitted toward the region where the display surface 50*a* is located that can be utilized by the interactive touch system 100, the other part of the invisible light beam (i.e. the invisible light beam IL having the divergence angle within the range R2 of another 180 degrees as shown in FIG. 4 and marked as IL2) is transmitted toward the cylindrical curved surface 124*b*. The invisible light beam IL2 is at least partially reflected by the cylindrical curved surface 124*b* and is not reflected or refracted again by the conical surface 124*a* and is transmitted toward the region where the display surface 50*a* is located, so as to be utilized by the interactive touch system 100, thereby enhancing utilization efficiency of the invisible light beam emitted by the light source device 120.

In this embodiment, as shown in FIG. 4, the central axis A of the cylindrical surface 124*a* is perpendicular to the display surface 50*a*, an apex angle α of the conical surface 124*a* is 90 degrees, and a light-emitting direction of the light-emitting element 122 is parallel to the central axis A of the conical surface 124*a*. All curvature central axes of the cylindrical curved surface 124*b* are parallel to the central axis A of the conical surface 124a, so that the invisible light beam IL is reflected by the conical surface 124a or sequentially reflected by the conical surface 124a and the cylindrical curved surface 124b and then transmitted in a direction parallel to the display surface 50a. More specifically, the cylindrical curved surface 124b of this embodiment is a semi-cylindrical concave surface, and this concave surface faces the conical surface 124a. Therefore, the curvature central axis of the cylindrical curved surface 124b in this embodiment is, as shown in FIG. 4, a single axis passing through the curvature center C, parallel to the central axis A of the conical surface 124a and perpendicular to the display surface 50a. In other embodiments, the cylindrical curved surface may be other regular or irregular curved surfaces having adequate shapes and have a plurality of curvature central axes parallel to the central axis A of the conical surface 124a. The cylindrical curved surface may be designed to have the curvature centers of merely partial section of the cylindrical curved surface not on the central axis A of the conical surface 124a. The invention is not limited thereto.

Referring to FIG. 4, in this embodiment, the cylindrical curved surface 124b has a reflective layer RL, and the reflective layer RL is, for example, a metal coating or reflective materials of other types that can be disposed on the cylindrical curved surface 124b via coating or adhesion. The reflective layer RL corresponds to the above-mentioned partial section of the cylindrical curved surface 124b with the curvature centers not located on the central axis A of the conical surface 124a, so that the invisible light beam IL transmitted from the conical surface 124a toward to the cylindrical curved surface 124b is reflected by the reflective layer RL without being reflected or refracted again by the conical surface 124a and is transmitted toward the region where the display surface 50a is located.

Divergence angle ranges r1-r5 as shown in FIG. 4 are a plurality of ranges divided from the divergence angle of the invisible light beam IL after being reflected by the conical surface 124a, and the divergence angle ranges r1-r5 do not overlap with each other. Herein, the invisible light beam IL (marked as IL1 and IL2 respectively) corresponding to divergence angle ranges r1 and r2, after being reflected by the cylindrical curved surface 124b, is not reflected or refracted again by the conical surface 124a and is transmitted toward the region where the display surface 50a is located. However, for the invisible light beam IL (marked as IL3, IL4 and IL5 respectively) corresponding to divergence angle ranges r3, r4 and r5, when reflected by the cylindrical curved surface 124b, at least part of the invisible light beams IL3, IL4 and IL5 proceed toward a position much closer to the central axis A and are transmitted again onto the conical surface 124a. In view of the above, the reflective layer RL in this embodiment is designed to be arranged merely on the parts of the cylindrical curved surface 124b corresponding to divergence angle ranges r1 and r2, but not on the parts of the cylindrical curved surface 124b corresponding to divergence angle ranges r3, r4 and r5, so as to prevent the invisible light beam IL within the divergence angle ranges r3, r4 and r5 from being reflected to the conical surface 124a by the cylindrical curved surface 124b and reflected or refracted again by the conical surface 124a to form stray light beam, and to ensure that the touch position of the object 70 (as shown in FIG. 1) determined by the invisible light detecting device 130 on the display surface 50a is not disturbed by the stray light beam.

In this embodiment, if the curvature center of the curved surface 124c and the central axis A of the conical surface 124a are the same, the curvature center C of the cylindrical curved surface 124b deviates from the central axis A of the conical surface 124a for 1 millimeter (mm), the divergence angle ranges r3 and r5 are, for example, 6 degrees, the divergence angle ranges r1 and r2 are, for example, 54 degrees, and the divergence angle r4 is, for example, 60 degrees, then the light source device 120 has better utilization efficiency of the invisible light beam IL. However, the invention is not limited thereto. In other embodiments, the divergence angles may be set according to a facula size of the invisible light beam IL emitted by the light-emitting element 122, a size of the light-guide element 124 and other design parameters, and the reflective layer RL may be arranged accordingly, so as to avoid generation of the stray light.

Based on the above, the embodiment of the invention has at least one of the following advantages. In this embodiment of the invention, the light-guide element has a cylindrical curved surface facing the conical surface, and curvature centers of at least partial section of the cylindrical curved surface are designed not to be located on a central axis of the conical surface. Thereby, when the invisible light beam is reflect to the cylindrical curved surface by the conical surface and further reflected by the reflective layer disposed on the cylindrical curved surface, the invisible light beam reflected by the reflective layer does not proceed toward the central axis of the conical surface and a position much closer to this central axis so as not to be reflected or refracted again by the conical surface. Accordingly, when the invisible light beam emitted by the light-emitting element is reflected by the conical surface and becomes an invisible light beam having a divergence angle of 360 degrees, in addition to one part of the invisible light beam (i.e. the invisible light beam having the divergence angle within 180 degrees) transmitted toward the display surface that can be utilized by the interactive touch system, the other part of the invisible light beam (i.e. the invisible light beam having the divergence angle within another 180 degrees) is at least partially reflected by the reflective layer disposed on the cylindrical curved surface without being reflected or refracted again by the conical surface and is transmitted toward the display surface, so as to be utilized by the interactive touch system, thereby enhancing utilization efficiency of the invisible light beam emitted by the light source device.

The foregoing description of the preferred embodiments of the invention has been presented for purposes of illustration and description. It is not intended to be exhaustive or to limit the invention to the precise form or to exemplary embodiments disclosed. Accordingly, the foregoing description should be regarded as illustrative rather than restrictive. Obviously, many modifications and variations will be apparent to practitioners skilled in this art. The embodiments are chosen and described in order to best explain the principles of the invention and its best mode practical application, thereby to enable persons skilled in the art to understand the invention for various embodiments and with various modifications as are suited to the particular use or implementation contemplated. It is intended that the scope of the invention be defined by the claims appended hereto and their equivalents in which all terms are meant in their broadest reasonable sense unless otherwise indicated. Therefore, the term "the invention", "the present invention" or the like does not necessarily limit the claim scope to a specific embodiment, and the reference to particularly preferred exemplary embodiments of the invention does not imply a limitation on the invention, and no such limitation is to be inferred. The invention is limited only by the spirit and scope of the appended claims. Moreover, these claims may refer to use "first", "second", etc. following with noun or element. Such terms should be understood as a nomenclature and should not be construed as giving the limitation on the number of the elements modified by such nomenclature unless specific number has been given. The abstract of the disclosure is provided to comply with the rules requiring an abstract, which will allow a searcher to quickly ascertain the subject matter of the technical disclosure of any patent issued from this disclosure. It is submitted with the understanding that it will not be used to interpret or limit the scope or meaning of the claims. Any advantages and benefits described may not apply to all embodiments of the invention. It should be appreciated that variations may be made in the embodiments described by persons skilled in the art without departing from the scope of the present invention as defined by the following claims. Moreover, no element and component in the present disclosure is intended to be dedicated to the public regardless of whether the element or component is explicitly recited in the following claims.

What is claimed is:

1. An interactive touch system, comprising:
a display device, adapted to provide an image beam to a display surface;
a light source device, comprising:
a light-emitting element; and
a light-guide element, having a conical surface and a cylindrical curved surface facing the conical surface, wherein curvature centers of at least partial section of the cylindrical curved surface are not located on a central axis of the conical surface, the light-emitting element is adapted to emit an invisible light beam toward the conical surface, and the invisible light beam is reflected by the conical surface and the cylindrical curved surface to be diverged and range over the display surface; and
an invisible light detecting device, wherein when an object moves to the display surface, the invisible light beam is reflected by the object to be detected by the invisible light detecting device.

2. The interactive touch system according to claim 1, wherein the invisible light beam is reflected by the conical surface and the cylindrical curved surface sequentially and then transmitted along a direction parallel to the display surface.

3. The interactive touch system according to claim 1, wherein the central axis of the conical surface is perpendicular to the display surface, an apex angle of the conical surface is 90 degrees, and a light-emitting direction of the light-emitting element is parallel to the central axis of the conical surface.

4. The interactive touch system according to claim 1, wherein all curvature central axes of the cylindrical curved surface are parallel to the central axis of the conical surface.

5. The interactive touch system according to claim 1, wherein one part of the invisible light beam is reflected by the conical surface and then transmitted toward a region where the display surface is located, and another part of the invisible light beam is reflected by the conical surface and then transmitted toward to the cylindrical curved surface and is further reflected by the cylindrical curved surface to be transmitted toward the region where the display surface is located.

6. The interactive touch system according to claim 1, wherein the region where the display surface is located and the cylindrical curved surface are located on two opposite sides of the conical surface respectively.

7. The interactive touch system according to claim 1, wherein the light source device is arranged at an edge of the display surface, and a divergence angle of the invisible light beam after being reflected by the conical surface and the cylindrical curved surface is larger than or equal to 180 degrees to range over the display surface.

8. The interactive touch system according to claim 1, wherein the cylindrical curved surface is a semi-cylindrical concave surface, and the semi-cylindrical concave surface faces the conical surface.

9. The interactive touch system according to claim 1, wherein the cylindrical curved surface has a reflective layer thereon, and the reflective layer corresponds to the partial section with the curvature centers not located on the central axis of the conical surface.

10. The interactive touch system according to claim 1, wherein the light-guide element is a cylindrical body, the cylindrical curved surface is located on a cylindrical surface of the cylindrical body, and the conical surface is located on a side surface of the cylindrical body.

11. A light source device, adapted for an interactive touch system, wherein the interactive touch system comprises a display device and an invisible light detecting device, and the display device is adapted to provide an image beam to a display surface, the light source device comprising:
a light-emitting element; and
a light-guide element, having a conical surface and a cylindrical curved surface facing the conical surface, wherein curvature centers of at least partial section of the cylindrical curved surface are not located on a central axis of the conical surface, the light-emitting element is adapted to emit an invisible light beam toward the conical surface, the invisible light beam is reflected by the conical surface and the cylindrical curved surface to be diverged and range over the display surface, and the invisible light beam is reflected by an object to be detected by the invisible light detecting device when the object moves to the display surface.

12. The light source device according to claim 11, wherein the invisible light beam is reflected by the conical surface and the cylindrical curved surface sequentially and then transmitted along a direction parallel to the display surface.

13. The light source device according to claim 11, wherein the central axis of the conical surface is perpendicular to the display surface, an apex angle of the conical surface is 90 degrees, and a light-emitting direction of the light-emitting element is parallel to the central axis of the conical surface.

14. The light source device according to claim 11, wherein all curvature central axes of the cylindrical curved surface are parallel to the central axis of the conical surface.

15. The light source device according to claim 11, wherein one part of the invisible light beam is reflected by the conical surface and then transmitted toward a region where the display surface is located, and another part of the invisible light beam is reflected by the conical surface and then transmitted toward to the cylindrical curved surface and is reflected by the cylindrical curved surface to be transmitted toward the region where the display surface is located.

16. The light source device according to claim 11, wherein the region where the display surface is located and the cylindrical curved surface are located on two opposite sides of the conical surface respectively.

17. The light source device according to claim 11, wherein the light source device is arranged at an edge of the display surface, and a divergence angle of the invisible light beam after being reflected by the conical surface and the cylindrical curved surface is larger than or equal to 180 degrees to range over the display surface.

18. The light source device according to claim 11, wherein the cylindrical curved surface is a semi-cylindrical concave surface, and the semi-cylindrical concave surface faces the conical surface.

19. The light source device according to claim 11, wherein at least part of the cylindrical curved surface has a reflective layer thereon, and the reflective layer corresponds to the partial section with the curvature centers not located on the central axis of the conical surface.

20. The light source device according to claim 11, wherein the light-guide element is a cylindrical body, the cylindrical curved surface is located on a cylindrical surface of the cylindrical body, and the conical surface is located on a side surface of the cylindrical body.

* * * * *